US007351153B2

(12) United States Patent
Nagano

(10) Patent No.: US 7,351,153 B2
(45) Date of Patent: Apr. 1, 2008

(54) GAMING MACHINE WITH HINGE CONSTRUCTION FOR ROTATABLY SUPPORTING DOOR

(75) Inventor: Hiroyuki Nagano, Tokyo (JP)

(73) Assignee: Aruze Corp., Tokyo (JP)

( * ) Notice: Subject to any disclaimer, the term of this patent is extended or adjusted under 35 U.S.C. 154(b) by 703 days.

(21) Appl. No.: 10/695,937

(22) Filed: Oct. 30, 2003

(65) Prior Publication Data

US 2004/0090151 A1 May 13, 2004

(30) Foreign Application Priority Data

Oct. 30, 2002 (JP) ............................ 2002-316731

(51) Int. Cl.
*A63F 13/08* (2006.01)
*G07F 17/34* (2006.01)

(52) U.S. Cl. ............................ 463/46; 463/20; 16/386; 16/262; 312/326; 312/329; 312/109

(58) Field of Classification Search ............ 273/143 R, 273/138.2, 138.1; 463/46, 20; 16/386, 262; 312/326, 329, 109
See application file for complete search history.

(56) References Cited

U.S. PATENT DOCUMENTS 1,393,139 A * 10/1921 Kiesel, Jr. ................ 384/190.6
4,987,639 A * 1/1991 Baiuley et al. ............... 16/445
2002/0107067 A1 8/2002 McGlone et al.

FOREIGN PATENT DOCUMENTS

| | | | |
|---|---|---|---|
| JP | 06-292758 | | 10/1994 |
| JP | 08240060 A | * | 9/1996 |
| JP | 2000024171 A | * | 1/2000 |
| WO | WO 01/34262 | | 5/2001 |

* cited by examiner

*Primary Examiner*—Benjamin Layno
(74) *Attorney, Agent, or Firm*—Arent Fox LLP

(57) ABSTRACT

In the slot machine 1, it is provided the hinge construction for rotatably supporting the frame plate 63 of the frame 6 against the door 3, and the hinge construction is basically constructed from: the lower bracket 82 arranged at the lower position in one side of an opening 80 which is formed in the door 3 corresponding to the frame 6; the support hole 83 formed in the ceiling plate 81 positioned at the upper side of the door 3 and the support hole 84 formed in the lower bracket 82; and the support shaft 64 that the upper end thereof inserted in the through hole 633 of the upper support plate 634 is rotatably supported in the support hole 83 of the ceiling plate 81 and the lower end thereof inserted in the through hole 635 of the lower support plate 636 is rotatably supported in the support hole 84 of the lower bracket 82.

11 Claims, 5 Drawing Sheets

GAMING MACHINE WITH HINGE CONSTRUCTION FOR ROTATABLY SUPPORTING DOOR

CROSS-REFERENCE TO THE RELATED APPLICATION

This application is based upon and claims a priority from the prior Japanese Patent Application No. 2002-316731 filed on Oct. 30, 2002, the entire contents of which are incorporated herein by reference.

BACKGROUND OF THE INVENTION

1. Field of the Invention

The present invention relates to a gaming machine with a door member installed at a front face of a cabinet so as to be able to open and close. In particular, the present invention relates to a gaming machine that the door is installed at the front face of the cabinet by a hinge construction which is not only very simple and low-cost but also sufficiently tolerable for frequent operation to open and close.

2. Description of Related Art

In a gaming machine such as a slot machine or a video gaming machine installed in a casino or game arcade, a door is arranged to a cabinet of a gaming machine so as to open and close. Managers in the casino or the penny arcade perform various treatments while the door is opened.

Concretely, among such treatments, it can raise, for instance, turning on and off of the gaming machine, changing setting condition of game contents, supplying game media in or taking game media from the gaming machine, conducting maintenance of the gaming machine when getting out of order and so on.

In order to conduct the above treatments, the door is comparatively frequently opened and closed, therefore it is required sufficient strength in the hinge construction to attach the door to the cabinet.

Taking the above situation into consideration, in those in the related art, the hinge construction utilized for attaching the door at the front face of the cabinet so as to open and close has almost very complex construction to maintain sufficient strength, as shown in Japanese Unexamined Publication No. Hei 6-292758. And material for making the hinge construction is almost metallic material to maintain durability of the hinge construction.

However, though the above hinge construction has high strength and durability, it is usual that the hinge construction is constructed from many parts due to complex construction thereof. As a result, cost in parts constructing the hinge construction becomes very high. And cost in personal expenses for assembling many parts also becomes very high.

Further, in the hinge construction mentioned above, it cannot help utilizing many parts made of metal material to maintain durability, thus there may occur a problem that the hinge construction is more expensive than the hinge construction constructed from parts made of synthesized resin and becomes heavy.

In addition, the above hinge construction structurally becomes bulky because the hinge construction is constructed from many parts. Therefore, it is required to consider beforehand the space where the hinge construction is arranged when interior of the gaming machine is designed. As a result, there occurs a problem that designing flexibility is lost and designing plan is very limited.

SUMMARY OF THE INVENTION

The present invention is accomplished to dissolve the above mentioned problems in the related art and it is an object to provide a gaming machine at the front face of which a door member is attache so as to open and close by a hinge construction which is very simple and low-cost, and in addition, has sufficient strength and durability.

According to one aspect of the present invention, it is provided a gaming machine as follows.

Namely, it is provided a gaming machine including:

a cabinet with a first opening;

a door rotatably attached at one side of the cabinet, the door opening and closing the first opening of the cabinet;

a second opening formed in front of the door; and a frame rotatably attached at one side of the second opening by a hinge construction;

wherein the hinge construction includes:

an upper support member arranged at an upper position in the one side of the second opening;

a lower support member arranged at a lower position in the one side of the second opening; and a shaft member with an upper end and a lower end rotatably retained in the frame; and wherein the upper end of the shaft member is rotatably supported in the upper support member and the lower end of the shaft member is rotatably supported in the lower support member.

In the above constructed gaming machine, in order to rotatably attach the frame by the hinge construction at one side of the second opening formed in front of the door which opens and closes the first opening of the cabinet, the upper end of the shaft member rotatably retained in the frame is rotatably supported in the upper support member and the lower end of the shaft member is rotatably supported in the lower support member. Thereby, the number of parts for assembling the hinge construction can be reduced, and not only cost in parts constructing the hinge construction but also cost in personal expenses for assembling can also be reduced. Further, the hinge construction has a compact structure, thereby space that the hinge construction occupies in interior of the gaming machine becomes very small. As a result, it is unnecessary to consider beforehand the space where the hinge construction is arranged when the interior of the gaming machine is designed. Thus, designing of the interior in the gaming machine can be flexibly conducted.

By the way, in those in the related art, the hinge construction utilized for rotatably supporting the frame generally has considerably complex construction to retain the strength thereof. As a result, cost in the hinge construction becomes very high and time for assembling becomes long. Further, the hinge construction becomes big and bulky.

On the contrary, in a case that the above constructed hinge construction is used to rotatably support the frame, the frame can be easily attached at the one side of the second opening formed in the door member by the simple construction. Further, since the hinge construction is very simply constructed, the hinge construction scarcely goes out of order and can sufficiently retain strength, According to another aspect of the present invention, it is provided a gaming machine including:

a cabinet with a first opening;

a door rotatably attached at one side of the cabinet, the door opening and closing the first opening of the cabinet;

a second opening formed in front of the door; and a frame rotatably attached at one side of the second opening by a hinge construction;

wherein the hinge construction includes:

an upper support member arranged at an upper position in the one side of the second opening;

an upper support hole formed in the upper support member;

a lower support member arranged at a lower position in the one side of the second opening;

a lower support hole formed in the lower support member;

an upper support plate formed at one side of the frame corresponding to the upper support member;

an upper through hole formed in the upper support plate corresponding to the upper support hole;

a lower support plate formed at the one side of the frame corresponding to the lower support member;

a lower through hole formed in the lower support plate corresponding to the lower support hole; and a shaft member with an upper end and a lower end;

wherein the upper end of the shaft member is inserted in the upper through hole and rotatably supported in the upper support hole, and wherein the lower end of the shaft member is inserted in the lower through hole and rotatably supported in the lower support hole.

In the above constructed gaming machine, in order to rotatably attach the frame by the hinge construction at one side of the second opening formed in front of the door which open and closes the first opening of the cabinet, the upper support plate having the upper through hole and the lower support plate having the lower through hole are arranged at the one side of the frame, and not only the upper end of the shaft member is inserted in the upper through hole and rotatably supported in the upper support hole, but also the lower end of the shaft member is inserted in the lower through hole and rotatably supported in the lower support hole. Thereby, the number of parts for assembling the hinge construction can be reduced, and not only cost in parts constructing the hinge construction but also cost in personal expenses for assembling can also be reduced. Further, the hinge construction is compactly assembled, thereby space that the hinge construction occupies in interior of the gaming machine becomes very small. As a result, it is unnecessary to consider beforehand the space where the hinge construction is arranged when the interior of the gaming machine is designed. Thus, designing of the interior in the gaming machine can be flexibly conducted.

According to further another aspect of the present invention, it is provided a gaming machine including:

a cabinet with an opening;

a door rotatably attached at one side of the cabinet, the door opening and closing the opening of the cabinet; and a hinge construction for rotatably supporting the door at the one side of the cabinet;

wherein the hinge construction includes:

an upper support member arranged at an upper position in the one side of the cabinet;

a lower support member arranged at a lower position in the one side of the cabinet; and a shaft member with an upper end and a lower end, the shaft member being rotatably retained in the door;

wherein the upper end of the shaft member is rotatably supported in the upper support member, and wherein the lower end of the shaft member is rotatably supported in the lower support member.

In the above constructed gaming machine, in order to rotatably attach the door, which opens and closes the opening of the cabinet, by the hinge construction at one side of the cabinet, the upper end of the shaft member retained in the door is rotatably supported in the upper support member and the lower end of the shaft member is rotatably supported in the lower support member. Thereby, the number of parts for assembling the hinge construction can be reduced, and not only cost in parts constructing the hinge construction but also cost in personal expenses for assembling can also be reduced. Further, the hinge construction is compactly assembled, thereby space that the hinge construction occupies in interior of the gaming machine becomes very small. As a result, it is unnecessary to consider beforehand the space where the hinge construction is arranged when the interior of the gaming machine is designed. Thus, designing of the interior in the gaming machine can be flexibly conducted.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated herein and constitute a part of this specification illustrate embodiments of the invention and, together with the description, serve to explain the objects, advantages and principles of the invention.

In the drawings.

DETAILED DESCRIPTION OF THE PREFERRED EMBODIMENTS

A gaming machine will be described with reference to drawings according to the embodiment embodying the present invention.

Hereinafter, though it will be described according to the embodiment that the present invention is embodied in a slot machine in which games are done using coins, it is, of course, apparent that the present invention can be embodied in various gaming machines such as a video gaming machine, a medal gaming machine, a card gaming machine and the like.

The slot machine of the embodiment will be described with reference to FIG. 1.

Figure 1:
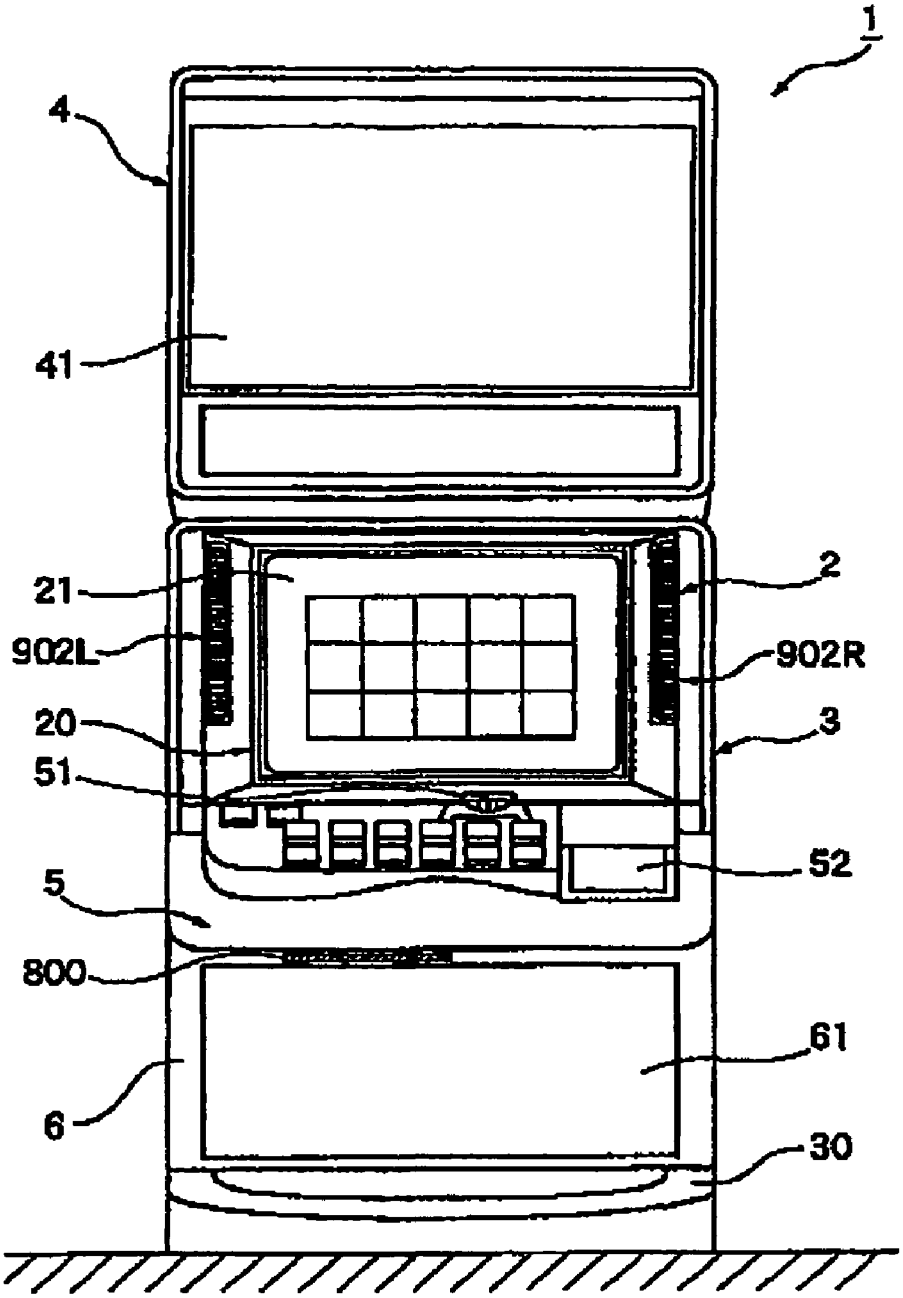
FIG. 1 is a front view of a slot machine according to the embodiment of the present invention.

FIG. 1 is a front view of the slot machine. The slot machine has a cabinet 2 at the front of which a door member 3 is arranged so as to be able to open and close. And a top frame 4 is arranged at an upper position of the cabinet 2. In front of the top frame 4, a decoration panel 41 is positioned.

An image display device 21, on which game information is displayed, is positioned in the cabinet 2. Further, at an upper part of the door member 3, a rectangular opening 20 is formed so that images displayed on the image display device 21 can be seen from the outside of the slot machine 1. A clear plate 80 (see FIG. 5) is arranged in the rectangular opening 20 so as to be able to see images displayed on the image display device 21 through the rectangular opening 20 and protect the display surface of the image display device 21. At both sides of the rectangular opening 20, speaker grills 902L, 902R are formed so that players can easily hear sounds or music provided based on game conditions.

At front central part of the door member 3, a control panel 5 is positioned, the control panel 5 being forwardly projected. And on a left inclined surface of the control panel 5, various operation buttons are arranged and a coin insertion slot 51 is formed. On a right side of the control panel 5, a bill insertion part 52 in which a bill guide plate 52A is arranged, is formed. The bill insertion part 52 guides bills inserted therethrough to a bill validator 22 (shown in FIG. 5) installed in the cabinet 2.

At a lower position of a pedestal forming the control panel 5, a display window 800 is formed. Through the display window 800, various numerals displayed on display parts of plural counters while being changed according to game conditions can be seen. Thereby, managers of the game arcade can directly confirm out of the slot machine 1 the numerals displayed by the counters installed in the cabinet 2, without opening the door member 3. The display window 800, of course, may be arranged at various positions such as a side surface of the slot machine 1, a lower position of the decoration panel 41 and a lower end of the slot machine 1.

A frame 6, which is connected to the door member 3 so as to be able to open and close against the door member 3, is arranged at a lower part of the control panel 5. A decoration panel 61 made of rectangular transparent glass plate or transparent synthetic resin plate with light transmitting ability is installed in the frame 6. At a bottom part of the door member 3 corresponding to a lower part of the frame 6, a coin tray 30 accumulating paid out coins is arranged.

Figure 2:
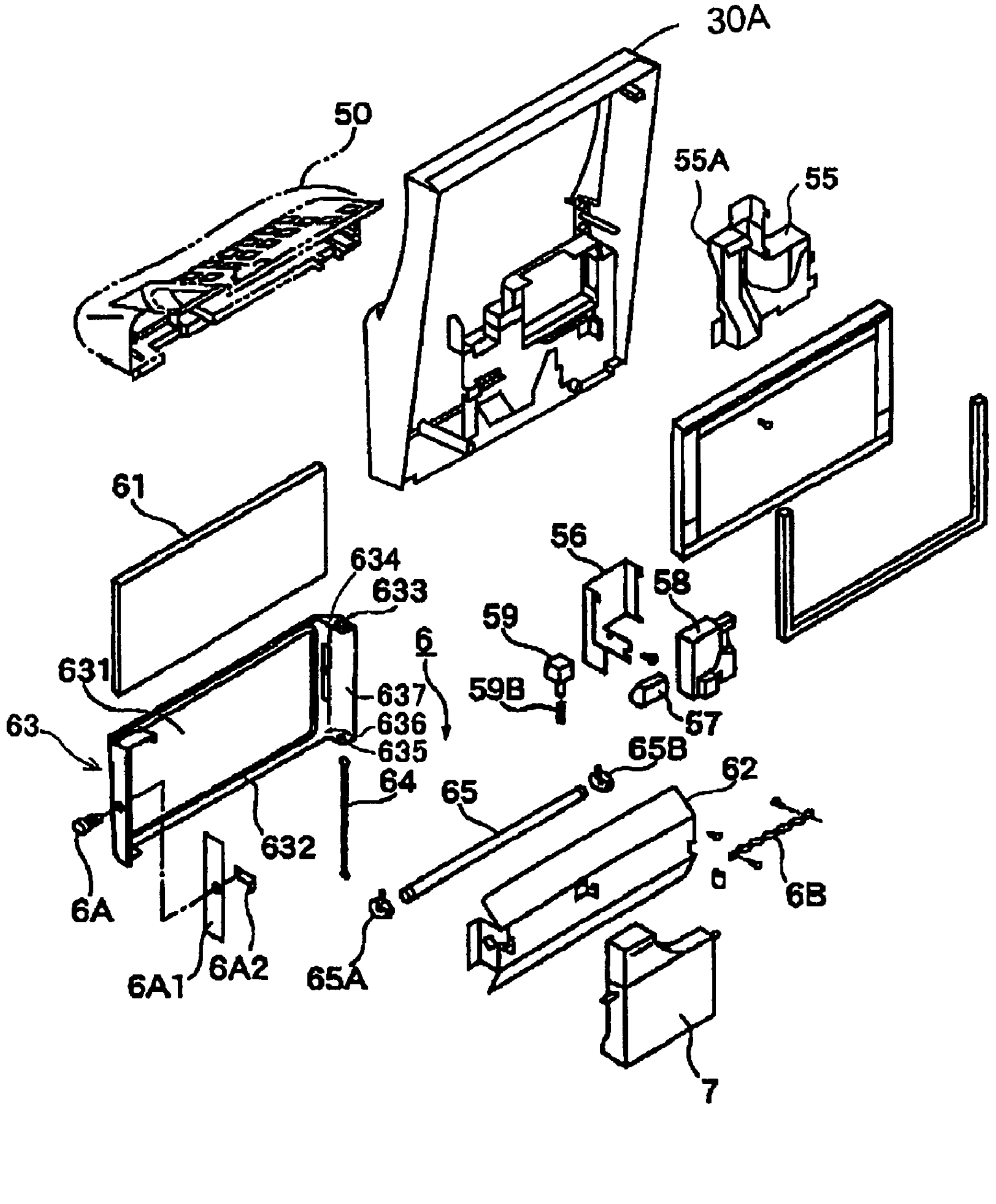
FIG. 2 is a perspective exploded view of a door member and a frame member in the slot machine according to the embodiment of the present invention.

Hereinafter, the frame 6 will be described with reference to FIG. 2. FIG. 2 is a perspective exploded view of the door member 3 and the frame 6.

In FIG. 2, a frame plate 63 is frame-shaped so as to have a window 631. The frame plate 63 is made of light metal material or light hard synthetic resin material and formed into one body. A decoration panel plate 61 is set in the frame plate 63. At a front part of the frame plate 63, the window 631 is opened so that decoration on the decoration panel plate 61 can be seen when the decoration panel plate 61 is set in the frame plate 63. And a receiving part 632 is formed so as to extend from the bottom part of the frame plate 63. The receiving part 632 supports the lower end edge of the decoration panel plate 61 and prevents the plate 61 from dropping downward.

At the left side of the frame plate 63, a plate 6A1 for fixing a cylinder lock 6A to the frame plate 63 is installed. A stop plate 6A2 for locking the frame 6 to the door member 3 is connected to the terminal end of the rotation shaft of the cylinder lock 6A. At an upper right position of the frame plate 63, an upper support plate 644 is formed in which a through hole 633 is formed, and at a lower left position of the frame plate 633, a lower support plate 636 is formed in which a through hole 635 is formed. In both the through hole 633 of the upper support plate 634 and the through hole 635 of the lower support plate 636, a support shaft 64 is inserted, both upper and lower ends of the support shaft 64 being rotatably supported in a support hole 83 of a ceiling plate 81 (mentioned later) of the door member 3 and in a support hole 84 of a lower bracket 82 (mentioned later), respectively. Thereby, the frame plate 63 is rotatably connected to the door member 3 through the support shaft 64.

Further, a cover 62 is positioned at the backside of the frame plate 63 and a pair of sockets 65A, 65B are installed inside of the cover 62. Both ends of a fluorescent tube 65 are connected and supported to the sockets 65A, 65B.

Here, in a state that the decoration panel plate 61 is removed from the frame plate 63, the fluorescent tube 65 can be easily exchanged since the window 631 formed in the frame plate 63 is comparatively wide. And the cover 62 is made of silver metal material, therefore the cover 62 reflects light scattered from the backside of the fluorescent tube 65 toward the decoration panel plate 61. As a result, the cover 62 can brightly light up the decoration panel plate 61 from the backside thereof.

A drain bottle 7 is installed at the rear side of the cover 62, the drain bottle 7 accumulating liquid such as beverage and the like without flowing into a hopper 25 (see FIG. 5) in a case that liquid flows into the cabinet 2 from the bill insertion part 52. On an upper surface of the drain bottle 7, an opening 70 is formed and a drain storage part continuous downward from the opening 70 is formed into a long sideways and thin shape. The thus constructed drain bottle 7 is installed along the rear side of the cover 62 on the basis of the long sideways shape thereof.

Here, the drain bottle 7 is made of transparent or semi-transparent material (for example, glass or synthetic resin) so as to visually confirm liquid quantity stored in the drain bottle 7 from outside thereof. And storage ability of the drain bottle 7 is set to about one litter.

Hereinafter, construction of a coin straddling device arranged at the backside of the door member 3 will be described according to FIG. 2. In FIG. 2, the coin insertion slot 51 (see FIG. 1) is arranged in a control panel 50 of the control panel 5. And a coin guide member 55 with a first coin guide path 55A is installed at the rear side of a front frame 30A. The coin inserted from the coin insertion slot 51 is guided to a coin straddling member 57 in a coin straddling device CS through the first coin guide path 55A of the coin guide member 55.

Further, at the rear side of the front frame 30A, a retaining bracket 56 is installed. The retaining bracket 56 retains the coin straddling member 57 rotatably. A detecting device 58 is positioned to the retaining bracket 56. The detecting device 58 detects whether the coin inserted from the coin insertion slot 51 and guided to the first coin guide path 55A is true or not and detects passage of the coin, there after transmits coin truth detection signal and coin passage signal to the control part of the slot machine 1.

At the left side of the retaining bracket 56, a magnetic solenoid 59 is fixed. when the solenoid 59 is magnetized, a compressing coil spring 59B is compressedly wound around a rod 59A attracted to the magnetic solenoid 59.

Figure 3:
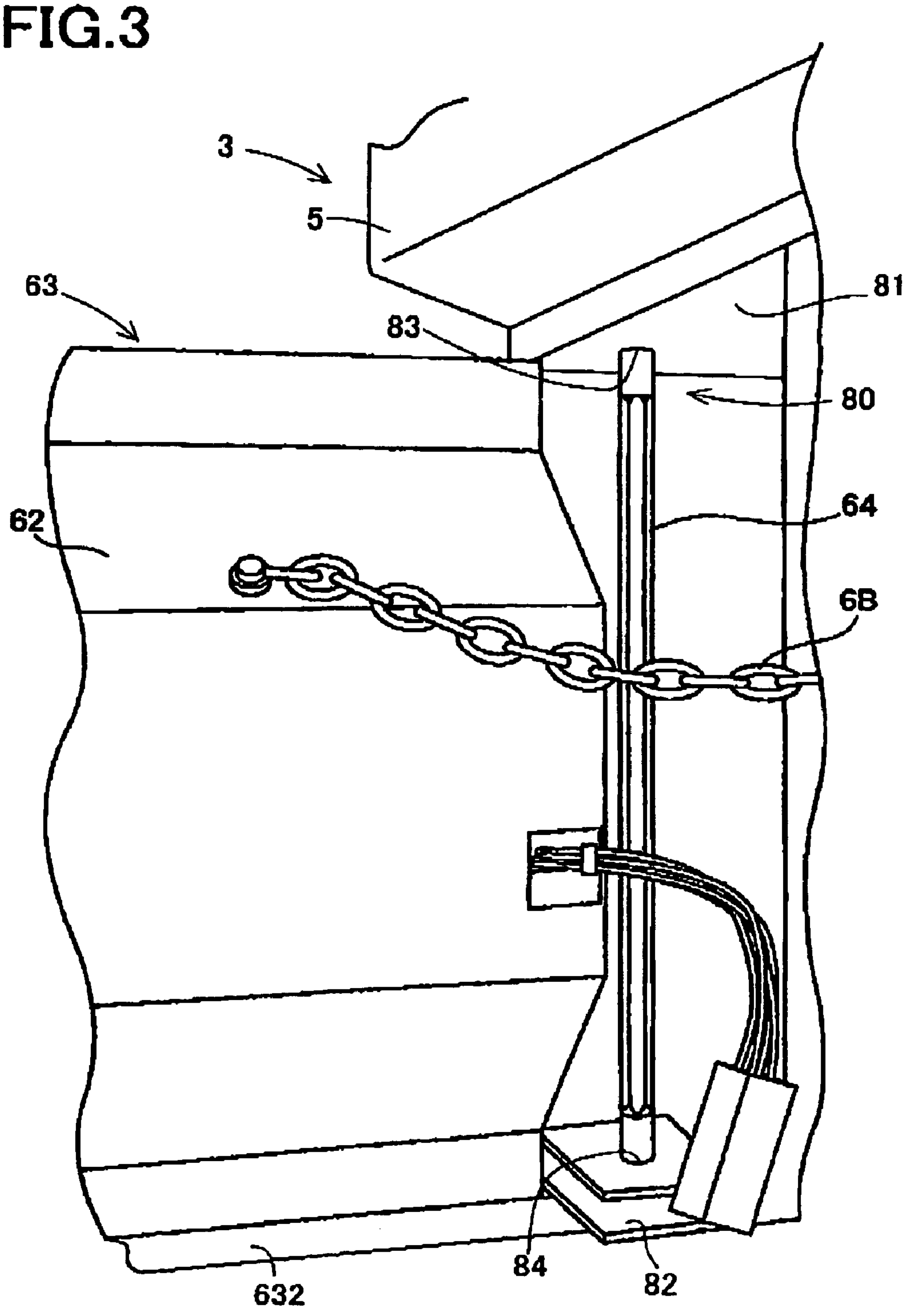
FIG. 3 is an explanation view indicating a backside state of the frame member when opened, according to the embodiment of the present invention.
Figure 4:
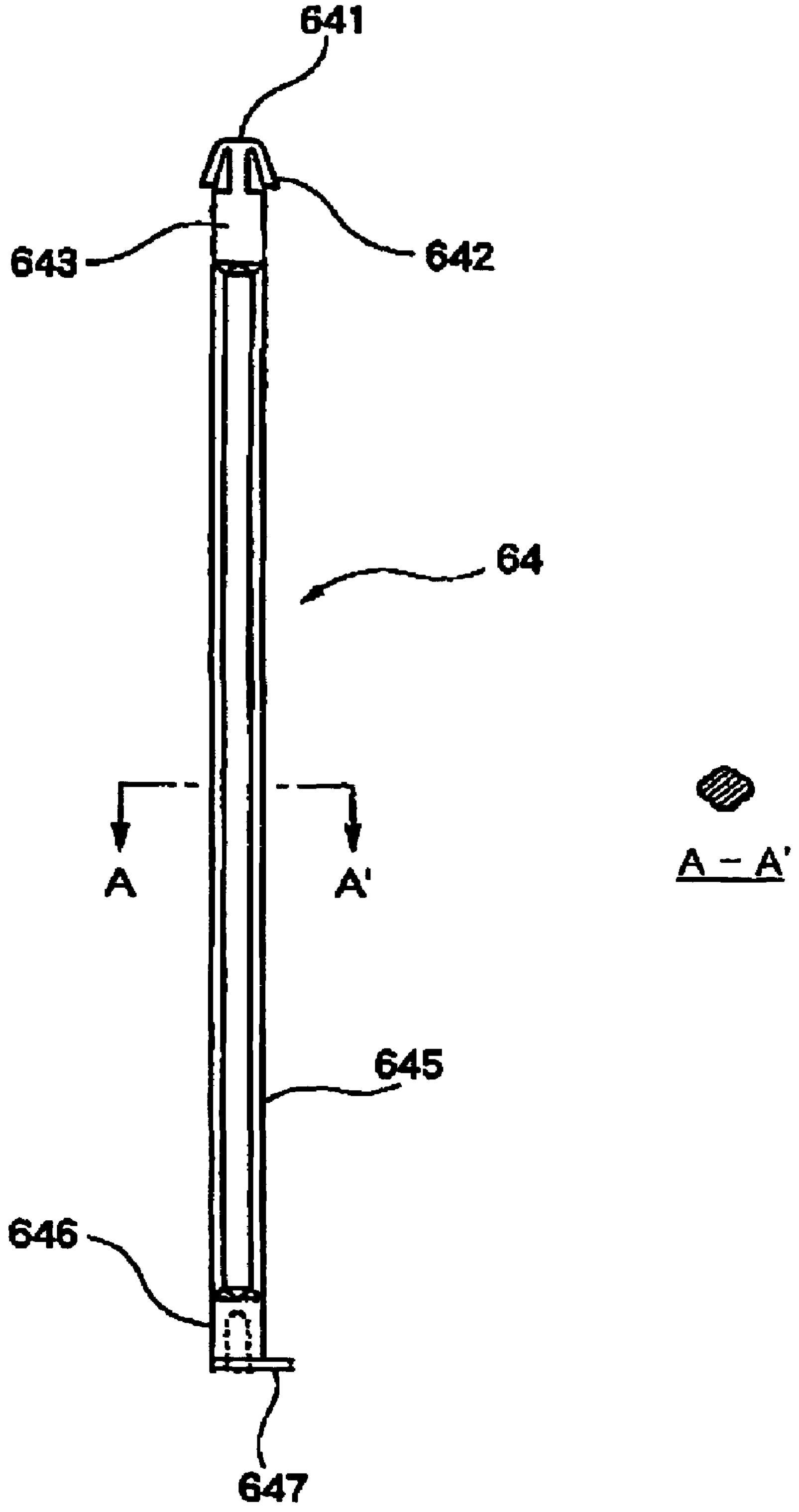
FIG. 4 is a front view of a support shaft constructing the hinge construction.

A hinge construction, through which the frame plate 63 constructing the frame 6 is rotatably supported in the door member 3, will be described with reference to FIGS. 2 to 4, hereinafter. FIG. 3 is an explanation view indicating a backside state of the frame when opened, according to the embodiment of the present invention, and FIG. 4 is a front view of a support shaft constructing the hinge construction.

In FIG. 3, the support plates 634 and 636 formed at the right side in the frame plate 63 are omitted so as to easily understand arranging situation of the support shaft 64.

As shown in FIG. 3, the hinge construction, through which the frame plate 63 constructing the frame 6 is rotatably supported in the door member 3, is basically constructed from: the lower bracket 82 arranged at the lower position in one side of an opening 80 which is formed in the door member 3 corresponding to the frame 6; the support hole 83 formed in the ceiling plate 81 positioned at the upper side of the door member 3 and the support hole 84 formed in the lower bracket 82; and the support shaft 64 that the upper end thereof inserted in the through hole 633 of the upper support plate 634 is rotatably supported in the support hole 83 of the ceiling plate 81 and the lower end thereof inserted in the through hole 635 of the lower support plate 636 is rotatably supported in the support hole 84 of the lower bracket 82.

As the hinge construction is constructed according to the above, the support shaft 64 and the frame plate 63 are a connected with each other, thereby the frame 6 can rotate around the support shaft 64 becoming rotational center.

And one end of a chain 6B is connected to the cover 62 and the other end thereof is connected to the door member 3. The chain 6B prevents the frame 6 from opening in excess of the predetermined angle, so as not to separate from the door member 3.

Here, as shown in FIG. 2, the support shaft 64 is covered by a connection part 637 connecting the upper support plate 634 and the lower support plate 636, and when the frame 6 is closed, the upper plane of the frame plate 63 is covered by the control unit 50 and the lower plane of the frame plate 63 is covered by the coin tray 30 (see FIG. 1). That is, the support shaft 64 becomes invisible from outside in a state that the frame 6 closes the opening 80 of the door member 3.

The support shaft 64 will be described with reference to FIG. 4. FIG. 4 is a front view of the support shaft 64. The support shaft 64 is made of hard resilient synthetic resin material into one body, so as to resiliently deform. As shown in FIG. 4, a projection portion 642 with an umbrella-like shape is formed at one end (upper end 641) of the support shaft 64 and a guard portion 647 is formed at the other end (lower end 646) opposite to the upper end 641.

A sectional shape sectioned by a plane perpendicular to an axis center of a shaft portion 645 in the support shaft 64 is shown in A-A' sectional view in FIG. 4, and the sectional shape of the shaft portion 645 has a shape which is formed by crossing two ellipses at right angle with each other. And outline width of the projection portion 642 is formed longer than a diameter of a circumcircle which is circumscribed to the shaft portion 645. On the other hand, the projection portion 642 is resiliently deformable and the outline width can resiliently deform to the width same as the diameter of the circumcircle of the shaft portion 645 or the width shorter than such diameter, when compressed. Further, the outline width of the projection portion 642 is formed so that the width becomes slightly longer than a diameter of the support hole 83 in the ceiling plate 81 arranged at the upper side in one side of the opening 80 formed in the door member 3 and slightly longer than a diameter of the support hole 84 formed in the lower bracket 82. Similarly, the outline width of the projection portion 642 is formed slightly longer than a diameter of the through hole 633 of the upper support plate 634 and slightly longer than a diameter of the through hole 635 of the lower support plate 636.

Procedures for assembling the frame 6 using the support shaft 64 will be described with reference to FIG. 5. FIG. 5 is an explanation view indicating procedures that the frame is installed to the opening 80 of the door member 3. In FIG. 5, only the ceiling plate 81, the upper support plate 634, the lower support plate 636, the lower bracket 82 and the support shaft 64 are extracted and shown so as to easily understand the procedures.

Figures 5A, 5B, 5C, 5D:
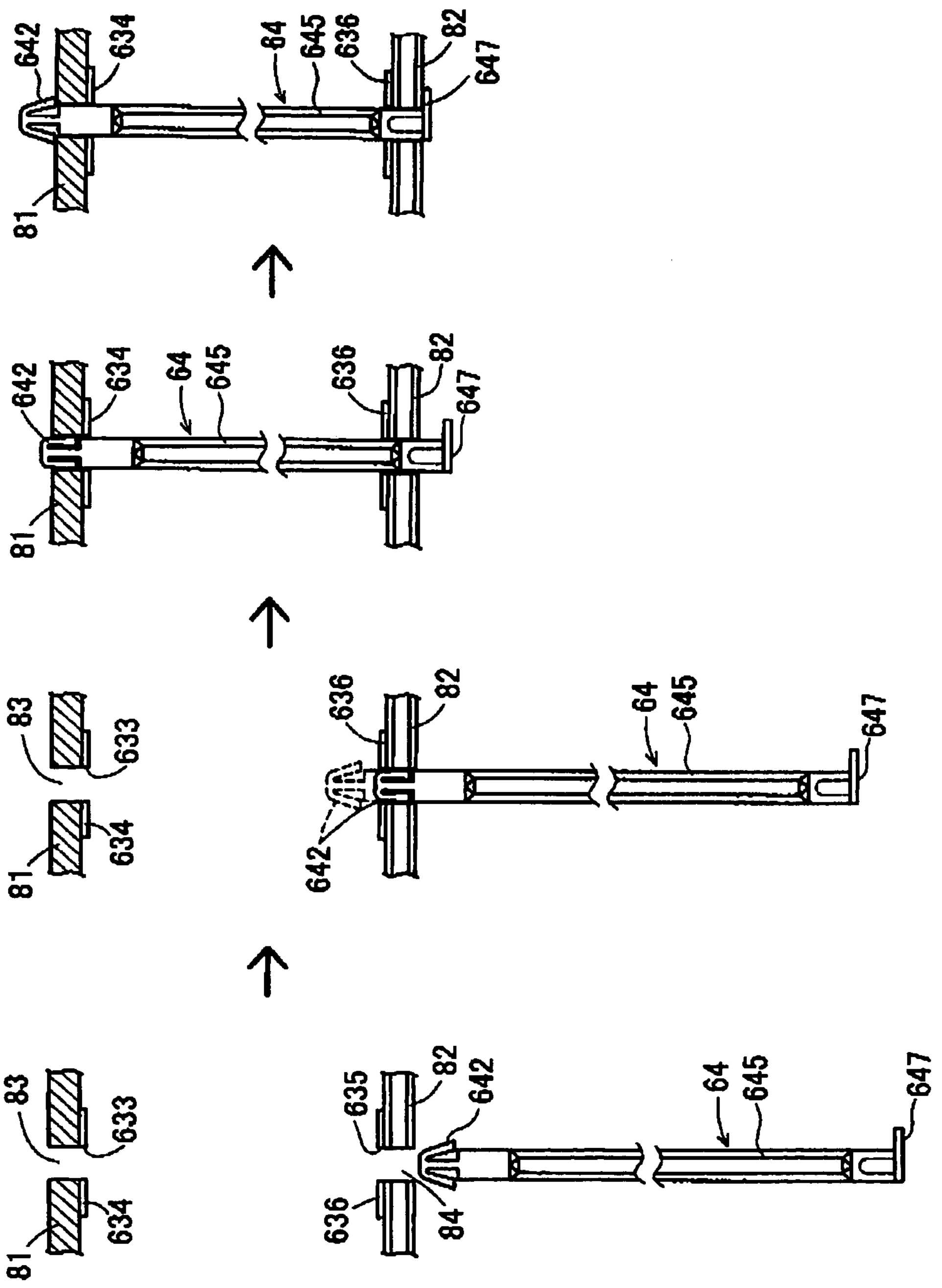
FIGS. 5A-5D are explanation views indicating procedures that the frame member is installed to an opening of the door member, according to the embodiment of the present invention.

In order to rotatably support the frame 6 in the opening 80 of the door member 3, at first, as shown in FIG. 5A, the through hole 633 formed in the upper support plate 634 of the frame plate 63 and the support hole 83 formed in the ceiling plate 81 are mutually coincided At the same time, the through hole 635 form d in the lower support plate 636 of the frame plate 63 and the support hole 84 formed in the lower bracket 82 are mutually coincided. Thereafter, the projection portion 642 formed at the upper end 641 of the support shaft 64 is arranged so as to coincide the support hole 84 of the lower bracket 82.

Continuously, as shown in FIG. 5B, the projection portion 642 is inserted from the lower side in the support hole 84 of the lower bracket 82 and the through hole 635 of the lower support plate 636. At that time, the projection portion 642 is resiliently deformed toward to the inner direction, and is moved upward in both the support hole 84 and the through hole 635 while being retained in the innerly compressed state. Further, after the projection portion 642 is goes out of the support hole 84 and the through hole 635, the projection portion 642 is expanded outward on the basis of the resilient force thereof. This state is shown by the dotted line in FIG. 5B. In this state, the outline width of the projection portion 642 becomes longer than the diameters of the support hole 84 and the through hole 635, thereby the support shaft 64 is held in the state that the projection portion 642 can no longer be drawn out from the support hole 84 and the through hole 635.

Thereafter, as shown in FIG. 5C, the shaft portion 645 of the support shaft 64 is continuously inserted upward in the support hole 84 and the through hole 635, and the projection portion 642 is inserted in the through hole 633 of the upper support plate 634 and the support hole 83 of the ceiling plate 81 from the lower side. At that time, similarly to the above, the projection portion 642 is resiliently deformed toward to the inner direction, and is moved upward in both the through hole 633 and the support hole 83 while being retained in the innerly compressed state. Further, after the projection portion 642 is goes out of the support hole 83 and the through hole 635, the projection portion 642 is expanded outward on the basis of the resilient force thereof. And lower end of the projection portion 642 contacts to the upper surface of the ceiling plate 81. At the same time, the guard portion 647 contacts to the lower surface of the lower bracket 82. This state is shown in FIG. 5D.

In the state shown in FIG. 5D, since the outline width of the projection portion 642 become longer than the diameters of the support hole 84 and the through hole 635, the support shaft 64 can no longer be drawn out from the support hole 84 and the through hole 635. And since the guard portion 647 contacts to the lower surface of the lower bracket 82, the support shaft 64 also cannot be drawn out toward to the upward direction.

As mentioned, it is assembled the hinge construction which rotatably supports the frame 6 to the opening 80 of the door member 3 by utilizing the support shaft 64.

Operation of the embodiment with the hinge construction will be described, hereinafter.

In the above hinge construction, the support shaft 64 is rotatably supported to both the ceiling plate 81, which is arranged to the upper side at one side of the opening 80 formed in the door member 3 corresponding to the frame 6, and the lower bracket 82. Thus, since the support shaft 64 is positioned at one side of the opening 80 of the door member 3, the hinge construction is also positioned so as to be pushed aside to one side of the opening 80. Therefore, space occupied in the interior of the slot machine 1 by the hinge construction can be made small, taking into consideration the situation that various parts are overcrowdedly mounted in the interior of the slot machine 1. Further, as shown in FIG. 4, since the support shaft 64 utilized in the hinge construction has a simple construction and is formed into one construction, it is easy to assemble the support shaft 64 in the hinge construction and the support shaft 64 scarcely goes out of order based on the simple construction thereof.

As mentioned according to FIG. 2, the support shaft 64 is covered by the curved connection part 637 connecting the upper support plate 634 and the lower support plate 636, and when the frame 6 is closed, the upper surface of the frame plate 63 is covered by the control unit 50 of the control panel 5 and the lower surface of the frame plate 63 is covered by the coin tray 30 (see FIG. 1). Therefore, when the frame 6 closes the opening 80 of the door member 3, it can make the support shaft 64 invisible from outside. As a result, it can prevent the hinge construction from being broken by mischief.

Further, as mentioned, when assembling the hinge construction, the projection portion 642 of the support shaft 64 can be easily inserted in the through hole 633 of the upper support plate 634, the support hole of the ceiling plate 81 from the support hole 84 of the lower bracket 82, the through hole 635 of the lower support plate 636, based on that the projection portion 642 is resiliently deformed to the inner direction thereof, thus the hinge construction can be easily assembled. In addition, after assembling the hinge construction, since the outline width of the projection portion 642 becomes longer than the diameters of the support hole 84 and the through hole 635, it concludes to a state that the support shaft 64 can no longer be drawn out downward. And since the guard portion 647 contacts to the lower surface of the lower bracket 82, it also concludes a state that the support shaft 64 can no longer be drawn out upward.

Furthermore, based on that the support shaft 64 is made of hard resilient deformable synthetic resin material into one body, weight thereof can reduce and reduction in cost can accomplish. And since contact area of the shaft portion 645 contacting to inner surfaces of the support hole 83, the through hole 633, the support hole 84 and the through hole 635 can reduce (theoretically the shaft portion 645 and each hole mutually contact with point contact manner) while retaining sufficient strength of the shaft portion 645, frictional resistance between the shaft portion 645 and each hole can be reduced when the frame 6 is opened and closed.

What is claimed is:

1. A gaming machine including:

a cabinet with a first opening;

a door rotatably attached at one side of the cabinet, the door opening and closing the first opening of the cabinet;

a second opening formed in front of the door; and a frame rotatably attached at one side of the second opening by a hinge construction;

wherein the hinge construction includes:

an upper support member arranged at an upper position in the one side of the second opening, wherein the upper support member defines a ceiling of the second opening;

a lower support member arranged at a lower position in the one side of the second opening, wherein the lower support member defines a bottom of the second opening; and a shaft member with an upper end and a lower end rotatably retained in the frame; and wherein the upper end of the shaft member is rotatably supported in the upper support member and the lower end of the shaft member is rotatably supported in the lower support member.

2. The gaming machine according to claim 1, further comprising:

an upper support hole formed in the upper support member;

a lower support hole formed in the lower support member;

a projection portion with an outline width formed at the upper end of the shaft member, the projection portion being resiliently deformable and the outline width being longer than diameters of the upper support hole and the lower support hole;

wherein the projection portion is inserted in both the upper support hole and the lower support hole while being resiliently deformed to an inner direction thereof.

3. The gaming machine according to claim 2, wherein the projection portion returns to an original state based on resilient deformation after inserted in the upper support hole and the lower support hole, and a lower end of the projection portion contacts to an upper surface of the upper support member.

4. The gaming machine according to claim 2, further comprising:

a guard portion formed at the lower end of the shaft member;

wherein the guard portion contacts to a lower surface of the lower support member.

5. The gaming machine according to claim 4, wherein the shaft member has a shaft portion connecting the projection portion and the guard portion, and the shaft portion is formed in a sectional shape that is figured by crossing two ellipses at right angle with each other.

6. The gaming machine according to claim 5, wherein the outline width of the projection portion is longer than a diameter of a circumcircle which is circumscribed to the shaft portion and is resiliently deformable to a state that the outline width resiliently deforms to the diameter or shorter.

7. The gaming machine according to claim 2, further comprising:

an upper support plate formed at one side of the frame corresponding to the upper support member;

a lower support plate formed at the one side of the frame corresponding to the lower support member;

an upper through hole formed in the upper support plate corresponding to the upper support hole; and a lower through hole formed in the lower support plate corresponding to the lower support hole;

wherein the outline width of the projection portion is formed longer than diameters of the upper through hole and the lower through hole, and wherein the projection portion is inserted in the upper through hole and the lower through hole while being resiliently deformed to the inner direction thereof.

8. The gaming machine according to claim 2, wherein the projection portion is formed in an umbrella-like shape.

9. The gaming machine according to claim 1, wherein the shaft member is made of synthetic resin.

10. The gaming machine according to claim 1, wherein the shaft member is made invisible from outside while the frame closes the second opening of the door.

11. A gaming machine including:

a cabinet with a first opening;

a door rotatably attached at one side of the cabinet, the door opening and closing the first opening of the cabinet;

a second opening formed in front of the door; and a frame rotatably attached at one side of the second opening by a hinge construction;

wherein the hinge construction includes:

an upper support member arranged at an upper position in the one side of the second opening, wherein the upper support member defines a ceiling of the second opening;

an upper support hole formed in the upper support member;

a lower support member arranged at a lower position in the one side of the second opening, wherein the lower support member defines a bottom of the second opening;

a lower support hole formed in the lower support member;

an upper support plate formed at one side of the frame corresponding to the upper support member;

an upper through hole formed in the upper support plate corresponding to the upper support hole;

a lower support plate formed at the one side of the frame corresponding to the lower support member;

a lower through hole formed in the lower support plate corresponding to the lower support hole; and a shaft member with an upper end and a lower end;

wherein the upper end of the shaft member is inserted in the upper through hole and rotatably supported in the upper support hole, and wherein the lower end of the shaft member is inserted in the lower through hole and rotatably supported in the lower support hole.

* * * * *